(12) United States Patent
Chen et al.

(10) Patent No.: US 12,214,448 B2
(45) Date of Patent: Feb. 4, 2025

(54) ROBOTIC WELDING DEVICE EMPLOYING FLEXIBLE GUIDE RAIL, AND WELDING METHOD

(71) Applicant: CHINA CONSTRUCTION SCIENCE AND INDUSTRY CORPORATION LTD, Guangdong (CN)

(72) Inventors: Zhenming Chen, Guangdong (CN); Tao Chen, Guangdong (CN); Gongfeng Luan, Guangdong (CN); Jisheng Yu, Guangdong (CN); Junhong Zhou, Guangdong (CN); Jialiang Yu, Guangdong (CN); Minghui Qiu, Guangdong (CN); Xinhua Fei, Guangdong (CN); Dazhuang Li, Guangdong (CN); Ruguo Gao, Guangdong (CN); Ning Tang, Guangdong (CN); Kang Chen, Guangdong (CN)

(73) Assignee: CHINA CONSTRUCTION SCIENCE AND INDUSTRY CORPORATION LTD, Guangdong (CN)

( * ) Notice: Subject to any disclaimer, the term of this patent is extended or adjusted under 35 U.S.C. 154(b) by 847 days.

(21) Appl. No.: 17/416,673

(22) PCT Filed: Aug. 2, 2019

(86) PCT No.: PCT/CN2019/098980
§ 371 (c)(1),
(2) Date: Jun. 21, 2021

(87) PCT Pub. No.: WO2020/125019
PCT Pub. Date: Jun. 25, 2020

(65) Prior Publication Data
US 2022/0072666 A1      Mar. 10, 2022

(30) Foreign Application Priority Data

Dec. 20, 2018   (CN) .......................... 201811562597.3

(51) Int. Cl.
*B23K 37/02*       (2006.01)
*B23K 9/095*       (2006.01)
(Continued)

(52) U.S. Cl.
CPC ........ *B23K 37/0217* (2013.01); *B23K 9/0953* (2013.01); *B23K 9/0956* (2013.01);
(Continued)

(58) Field of Classification Search
None
See application file for complete search history.

(56) References Cited

FOREIGN PATENT DOCUMENTS

| CN | 103624430 A | 3/2014 |
|---|---|---|
| CN | 104741735 A | 7/2015 |

(Continued)

OTHER PUBLICATIONS

Machine translation of CN-106624523-A, May 2024(Year: 2024).*
(Continued)

*Primary Examiner* — Geoffrey S Evans
(74) *Attorney, Agent, or Firm* — Crowell & Moring LLP; John C. Freeman (57) ABSTRACT

A robotic welding device including a control box configured to pre-store various welding processes and generate a welding parameter. A wire feed mechanism configured to feed a welding wire to a welding gun and a flexible guide rail attached to a welding component. A welding robot including a robot body and a welding gun. A teaching apparatus in communication with the welding robot and the control box, controlling, a traveling path and an operation position of the welding robot, and adjusting oscillation and welding opera- (Continued)

tions of the welding gun according to an instruction of the control box. A remote control terminal in communication with the control box, and in communication with a data acquisition device of the welding robot. The robotic welding device including a welding power supply.

7 Claims, 4 Drawing Sheets

(51) Int. Cl.
    *B23K 9/10*         (2006.01)
    *B23K 9/133*      (2006.01)
    *B23K 9/16*         (2006.01)

(52) U.S. Cl.
    CPC ............ *B23K 9/1087* (2013.01); *B23K 9/133* (2013.01); *B23K 9/164* (2013.01); *B23K 37/0247* (2013.01)

(56) References Cited

FOREIGN PATENT DOCUMENTS

| | | | | | |
|---|---|---|---|---|---|
| CN | 205551753 | U | * | 9/2016 | |
| CN | 205989108 | U | * | 3/2017 | |
| CN | 106624523 | A | * | 5/2017 | |
| CN | 108188548 | A | * | 6/2018 | ............ B23K 9/095 |
| CN | 108480895 | A | | 9/2018 | |
| JP | 2017223044 | A | * | 12/2017 | |
| KR | 10-2013-0003754 | A | | 1/2013 | |

OTHER PUBLICATIONS

Machine translation of CN-108188548-A, May 2024 (Year: 2024).*
Machine translation of CN-205551753-U May 2024 (Year: 2024).*
Machine translation of CN-205989108-U May 2024 (Year: 2024).*
Machine translation of JP-2017223044-A, May 2024 (Year: 2024).*
International Search Report dated Oct. 29, 2019 (6 pages including English translation) out of PCT Priority Application PCT/CN2019/098980.
Written Opinion dated Oct. 29, 2019 (7 pages including English translation) out of PCT Priority Application PCT/CN2019/098980.
International Preliminary Report on Patentability dated Jun. 16, 2021 (4 pages foreign text) out of PCT Priority Application PCT/CN2019/098980.

* cited by examiner

ROBOTIC WELDING DEVICE EMPLOYING FLEXIBLE GUIDE RAIL, AND WELDING METHOD

BACKGROUND OF THE INVENTION

This application is a National Stage application of International Application No. PCT/CN2019/098980, filed Aug. 2, 2019.

This application claims priority under 35 U.S.C. § 119 (a) to Chinese Patent Application No. 201811562597.3, filed on Dec. 20, 2018.

TECHNICAL FIELD

The present invention relates to a robotic welding device employing flexible guide rail in steel construction structure and an automatic welding method, which mainly relates to an automatic welding employing mini robot and applied to components with arc shape and which can be used to monitor a welding machine remotely through a remote control system, and the present invention relates to the field of steel structure manufacturing.

BACK GROUND

As an extremely important part in the manufacturing industry, welding technology directly affects product quality, usability, and production cost and efficiency. With the development of modern industry, high-efficiency, intelligentization and digitalization will always be the trend of industry development. Robots have been widely used in the industries such as automobiles, electronic and electrical appliances and so on, in the steel construction structure manufacturing industry, although efficient automatic welding equipment has been gradually used, the application of welding robots is still in an exploratory stage, and the application of welding robots in the steel structure industry will definitely comply with the development trend.

At present, during the manufacture of steel structures, high-efficiency gas shielded welding and welding by submerged arc welding equipment requires straight rails to complete the welding. However, manual welding is still required for the production of components with arc shape, which does not have high production efficiency, and the shaping of the appearance of the welding line has high requirements for operating skill of the welder, which will cause great operating difficulty.

SUMMARY

The present invention is to provide a robotic welding device employing a flexible guide rail and a welding method. The automatic welding of components with arc shape can be achieved by using a mini-type arc welding robot, and utilizing the functions of automatic detection, groove recognition, welding parameters generation, and with the cooperation of a specialized flexible rail, and the welding parameters can be adjusted through remote control over the welding equipment by a computer.

The technical solution adopted by the present invention to solve the above problems is as follows:

A robotic welding device employing a flexible guide rail, including a control box, pre-storing various welding processes and generating a welding parameter according to actual welding position and bevel shape; a wire feed mechanism, feeding welding wire to a welding gun; a flexible guide rail, attached to a welding component with the flexibility thereof; a welding robot, comprising a robot body movably disposed on the flexible guide rail and movable along the same, and a welding gun disposed on the robot body and controlled by the same to weld the welding component; a demonstrator, respectively in communication with the welding robot and the control box, controlling a traveling path and an operation position of the welding robot, and adjusting oscillation and welding operations of the welding gun according to an instruction of the control box; a remote control terminal, in communication with the control box, so as to remotely monitor and configure the welding parameter generated or acquired by the control box, and in communication with a data acquisition device of the welding robot, so as to remotely monitor and configure the welding parameter during a welding process; and a welding power supply, for supplying power.

Preferably, the wire feed mechanism is provided with a gas cylinder that provides shielding gas for the welding wire.

Specifically, the wire feed mechanism comprises a wire feed frame provided with a welding wire wheel, a wire tightening device and an adjustment knob, and the wire feed mechanism can continuously feed the welding wire and controls the feeding of the welding wire.

Specifically, the flexible guide rail is provided with a plurality of magnetic adhesion devices, and the plurality of magnetic adhesion devices are located on the same side of the flexible guide rail, and any one of the magnetic adhesion devices comprises a connecting plate and an upper magnetic adhesion block and lower magnetic adhesion block and the connecting plate is fixed on a flexible guide rail through an outer side thereof, and the connecting plate is provided with the upper magnetic adhesion block and the lower magnetic adhesion block on an inner side thereof, and the flexible guide rail is attached to a welding member through the upper magnetic adhesion block and the lower magnetic adhesion block of each magnetic adhesion device.

Preferably, the upper magnetic adhesion block and the lower magnetic adhesion block are provided with a fixing knob. And the upper magnetic adhesion block and the lower magnetic adhesion block are fixed on side surfaces of the flexible guide rail.

Specifically, the welding robot comprises a supporting structure, a welding gun clamping device, and a rail trolley, and the supporting structure is operable to move the welding gun laterally and vertically through the welding gun clamping device, and the supporting structure is movable on the flexible rail through the track trolley.

Furthermore, the welding gun clamping device comprises a lateral adjustment structure and a vertical adjustment structure, and a swing device arranged on the vertical adjustment structure; and the vertical adjustment structure is arranged at an output end of the lateral adjustment structure, and the welding gun is arranged on the swing device, so as to realize a horizontal movement, vertical movement and angle adjustment of the welding gun. The rail trolley comprises a trolley body and a supporting structure is supported on the trolley body; the trolley body is provided with a driving wheel and a transmission wheel, and the transmission wheel is arranged on the trolley body through a roller connecting rod, and the driving wheel and the transmission wheel are respectively arranged on an inner side and outer side of the flexible rail, and the driving wheel is rollably engaged with the inner side of the flexible rail, the driving wheel is rollably engaged with the outer side of the flexible rail, and the driving wheel is driven to roll along the inner side of the flexible rail and drive the transmission wheel to roll along the outer side of the flexible rail.

Another technical solution of the present invention provides a robotic welding method employing the flexible rail, the method is performed based on the above welding device, which comprises the following steps, step 1, fixing the welding gun clamping device of the removable welding robot to the supporting structure, and then assembling the supporting structure and the rail trolley together;

step 2, connecting the welding robot to the demonstrator, connecting the demonstrator to the control box, connecting the control box, wire feed mechanism, and welding robot to a welding power source, and connecting the welding wire of the wire feed mechanism to the welding gun of the welding robot, such that all components can be operated normally;

step 3, fixing the flexible rail to a side surface of the welding member through the magnetic adhesion device, fixing the magnetic adhesion device onto a side face of the welding member through an adjusting knob to make an extension direction of the flexible rail matched with a shape of the welding component;

step 4, mounting the rail trolley onto the flexible rail to cause the welding robot to slide normally on the flexible rail, fixing the welding gun to the welding gun clamping device, and adjusting the welding gun to reach a welding angle;

step 5, accessing corresponding bevel form and welding position in the control box according to actual bevel shape of the welding component, before detecting the bevel, adjusting flow of the shielding gas, an extension length of the welding wire and an angle of the welding gun;

step 6, starting to detect the bevel shape, pressing a start button on the demonstrator to start sensing and detect a bevel angle, a plate thickness of the welding component, a root gap, a plate thickness difference and a welding length, and after completing sensing, moving the welding gun to a welding start point to prepare for welding;

step 7, after completing the sensing, according to bevel detection data, displaying the welding parameters generated automatically by the control box, monitoring the welding parameter by a remote control terminal, and setting the welding parameters, when needed, by the control box itself or the remote control terminal, and performing the welding during the whole welding process according to a layer pass and welding parameters set by the control box;

step 8, remotely monitoring and adjusting the welding parameters during the welding process, through data connection between a data collector of the welding robot and a remote computer;

step 9, after completing the welding, exiting a program, disassembling the flexible rail and the welding robot to complete the welding of the welding components.

The characteristics of the present invention lie in that:

1) welding robots, such as mini robots, are utilized in combination with magnetic adhesion flexible rails to realize the automatic detection of the welding grooves of arc shaped welding components.

2) The technical method of the present invention overcomes the problem that the conventional robot is unable to weld a long blind area of 300 mm long at both ends of the welding line and the robot of the present invention can oscillate normally to complete the welding of the long welding line;

3) The remote control of the welding process and monitoring and remote control of welding parameters can be realized through data collection, data transmission, and data processing in combination with the welding intelligent management system, such that an arc welding robot automatic welding technology employing flexible guide rails and capable of remote intelligent monitoring is formed.

Compared with the prior arts, the advantages of the present invention lie in that:

the intelligent automatic welding for various welding positions (flat welding, horizontal welding, vertical welding) and various welding seam forms (groove welding seams, fillet welding seams) of components with arc shape (box shape, H shape) can be realized, and the welding process can be remotely controlled through remote intelligent monitoring techniques to realize monitoring and remote control of welding parameters and solve the technical problem that components with arc shape can only be welded manually, and realize intelligent welding of components with arc shape and small section.

The welding robot is small in size and portable, and is easy to be carried, installed and operated; which can be used to realize automatic demonstration and automatic generation of the welding parameters; and the welding robot can be applied in a wide scope, and the entire welding process is highly intelligent, efficient and high-quality; and when the welding robot works with straight or flexible rails, an automatic welding of components with straight shape or arc shape can be achieved, which is convenient for wide applications.

REFERENCE LABELS 1 welding power source;
2 control box;
3 robot body;
4 welding gun;
5 wire;
6 demonstrator;
7 wire feed mechanism;

8 flexible rail;
9 magnetic adhesion device;
10 gas cylinder;
11 remote control terminal.

DETAILED DESCRIPTION

The embodiments of the present application are described in detail in conjunction with the drawings as below.

Embodiment 1

Figure 1:
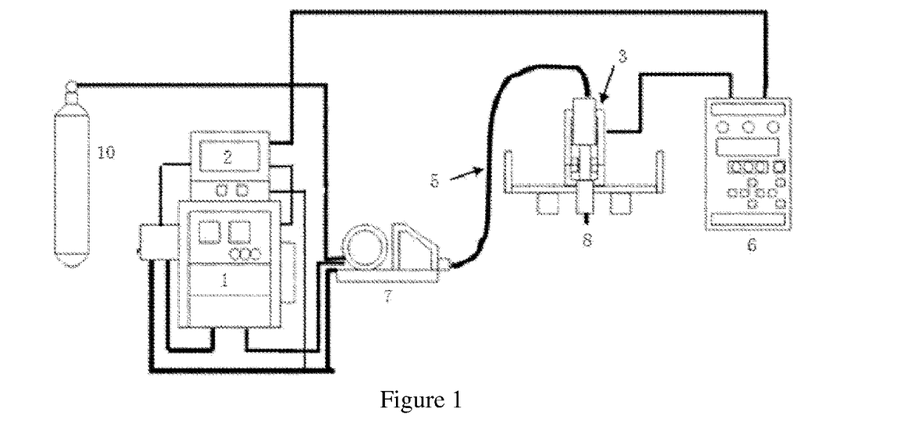
FIG. 1 is a structural view of a welding method of a mini-type arc welding robot in an embodiment of the present invention.
Figure 2:
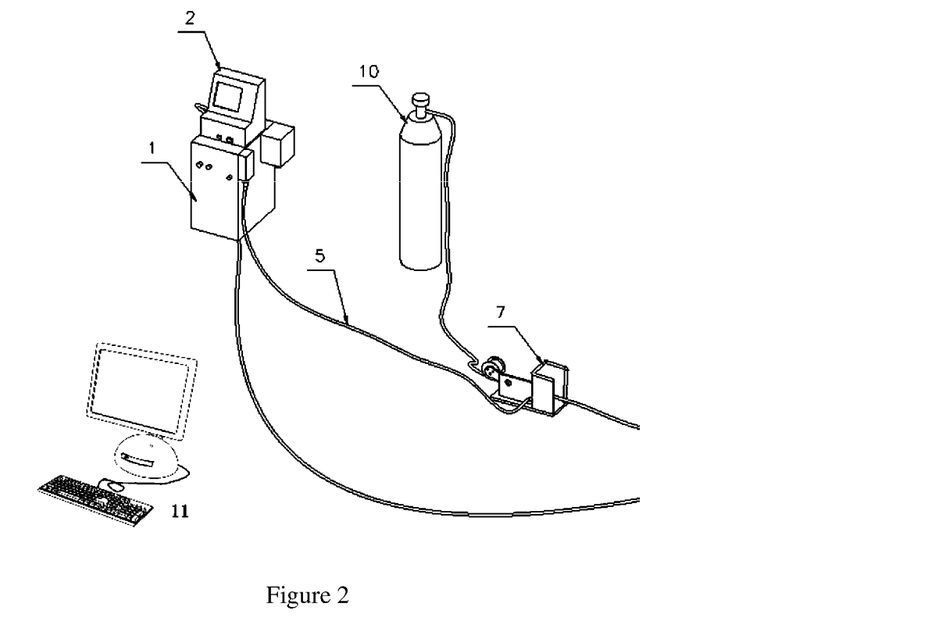
FIG. 2 is a partial schematic view of a mini-type arc welding robotic welding device employing flexible guide rail in an embodiment of the present invention.
Figure 3:
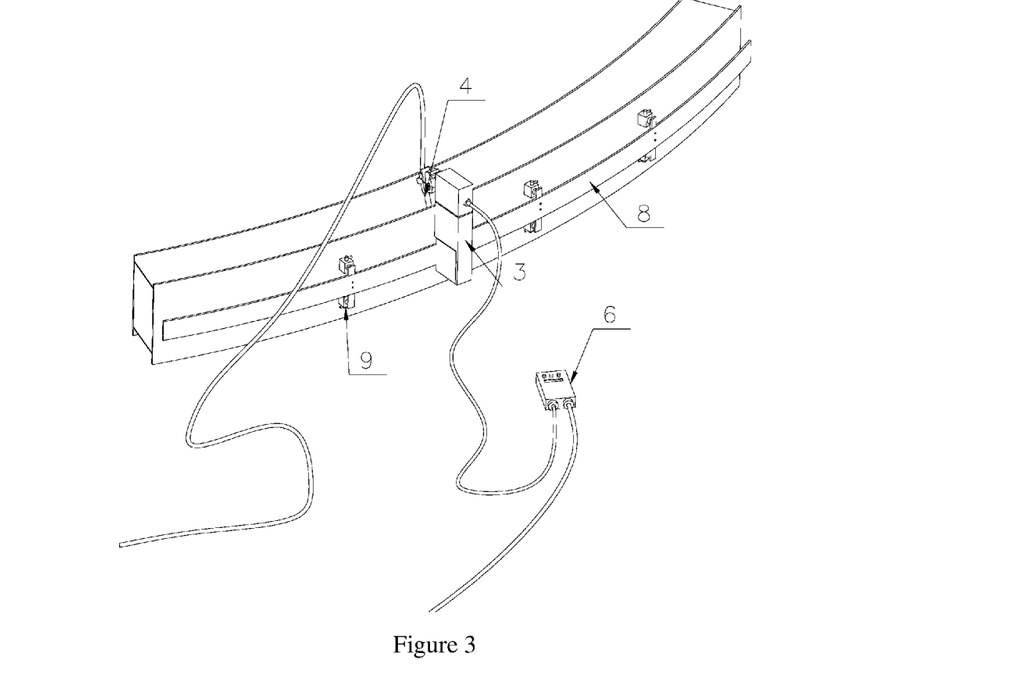
FIG. 3 is another partial schematic view of a mini-type arc welding robotic welding device employing a flexible guide rail according to an embodiment of the present invention.
Figure 4:
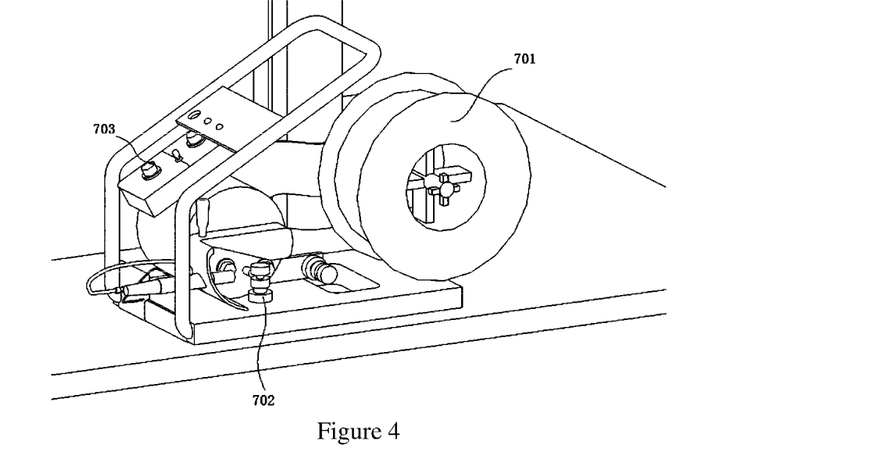
FIG. 4 is a schematic view of a wire feed mechanism according to an embodiment of the present invention.
Figure 5:
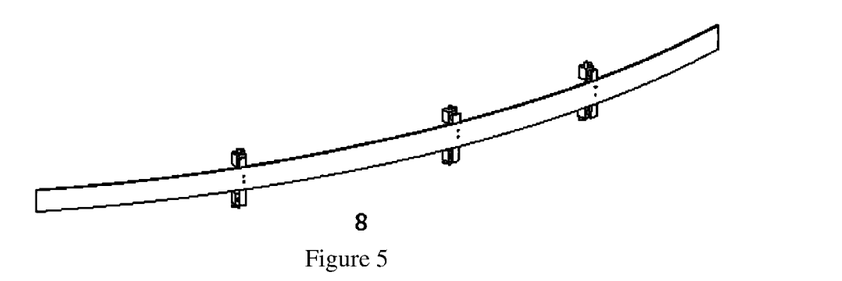
FIG. 5 is a schematic view of a flexible guide rail according to an embodiment of the present invention.
Figure 6:
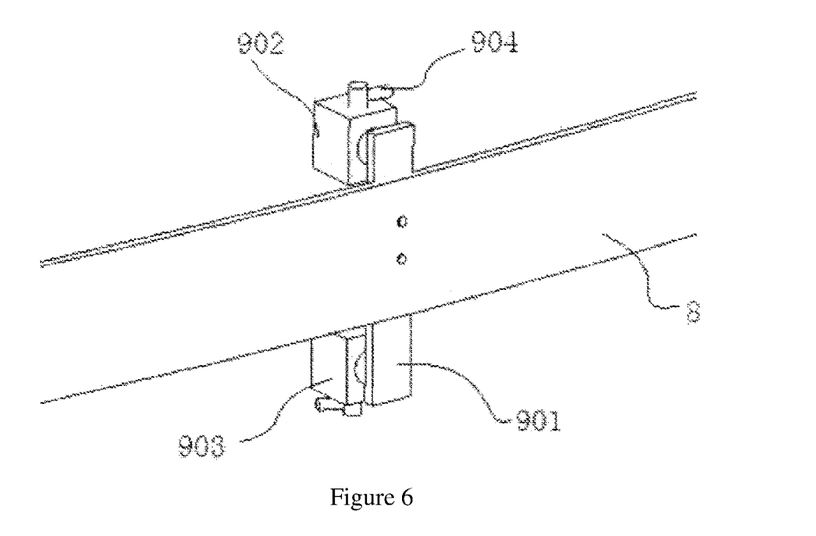
FIG. 6 is a partial schematic view of a flexible guide rail according to an embodiment of the present invention.

Robotic welding device employing flexible guide rail, comprising a control box, a wire feed mechanism, a flexible guide rail, a welding robot, a demonstrator,
- (1) The control box pre-stores various welding processes and generates a welding parameter according to actual welding position and bevel shape;
- (2) The wire feed mechanism feeds welding wire of a semi-automatic gas shielded welding to a welding gun, and specifically comprises a wire feed frame provided with a welding wire wheel 701, a wire tightening device 702 and an adjustment knob 703. In addition, a protective gas cylinder 10 provided to supply a protective gas for the welding wire;
- (3) The flexible guide rail is attached to a welding component with the flexibility thereof; especially the flexible guide rail is able to match with the welding components with arc shape according to its own flexibility characteristics; and the guide rail is provided with a plurality of magnetic adhesion devices 9, and the specific number of the magnetic adhesion devices 9 varies according to actual length of the flexible guide rail, and the plurality of magnetic adhesion devices are located on the same side of the flexible guide rail 8, and, as shown in FIG. 6, any one of the magnetic adhesion devices includes a connecting plate 901 and an upper magnetic adhesion block 902 and lower magnetic adhesion block 903 and the connecting plate 901 is fixed on a flexible guide rail 8 through an outer side thereof, and the connecting plate is provided with the upper magnetic adhesion block and the lower magnetic adhesion block on an inner side thereof, and the flexible guide rail is attached to a welding member through the upper magnetic adhesion block and the lower magnetic adhesion block of each magnetic adhesion device. At the same time, the upper magnetic adhesion block and the lower magnetic adhesion block are provided with a fixing knob 904, as shown in FIG. 6, for positioning the magnetic adhesion blocks;
- (4) a welding robot, comprising a robot body 3 and a welding gun 4, wherein the robot body 3 is movably disposed on the flexible guide rail 8 and movable along the same, and the welding gun 4 is disposed on the robot body 3 and controlled by the same to weld the welding component; the welding robot comprises a supporting structure 301, a welding gun clamping device, and a rail trolley, and the supporting structure 301 is operable to move the welding gun laterally and vertically through the welding gun clamping device, and the supporting structure is movable on the flexible rail through the track trolley.

Figure 7:
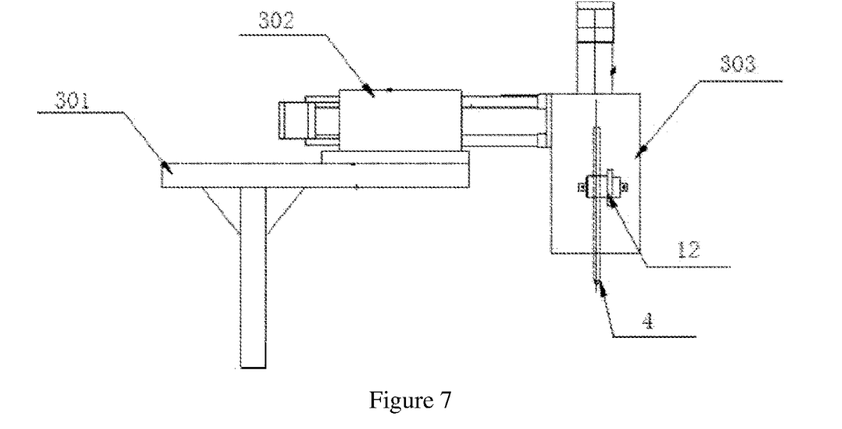
FIG. 7 is an assembly view of a supporting structure and a welding gun clamping device in an embodiment of the present invention.

The welding gun clamping device comprises a lateral adjustment structure 302 and a vertical adjustment structure 303, wherein, the vertical adjustment structure 303 is arranged at an output end of the lateral adjustment structure 302, and the welding gun 4 is arranged on the swing device of the vertical adjustment structure 303, the vertical adjustment structure 303 and the lateral adjustment structure 302 are respectively vertically telescopic cylinder and laterally telescopic cylinder, so as to realize a horizontal movement, vertical movement of the welding gun, and the swing device 12 is used to adjust a working angle of the welding gun.

Figure 8:
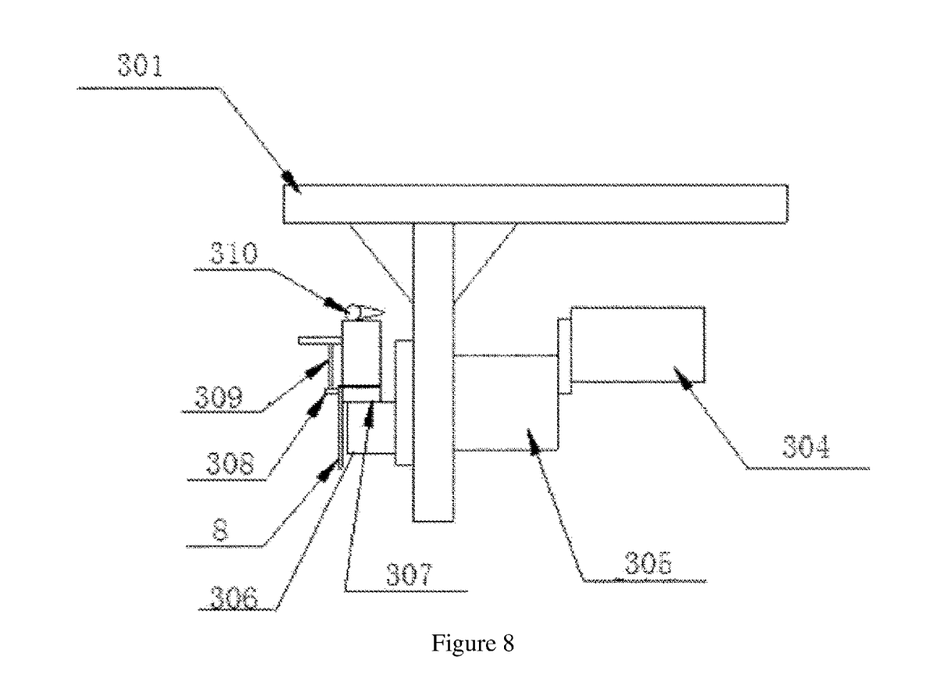
FIG. 8 is an assembly view of a supporting structure and a rail trolley in an embodiment of the present invention.

The rail trolley comprises a trolley body 306 and a supporting structure 301 is supported on the trolley body 306; and the trolley body 306 is provided with a driving wheel 307 and a transmission wheel 308, and the transmission wheel 308 is arranged on the trolley body 306 through a roller connecting rod 309, and the driving wheel 307 and the transmission wheel 308 are respectively arranged on an inner side and outer side of the flexible rail, and the driving wheel 307 is rollably engaged with the inner side of the flexible rail 8, the transmission wheel 308 is rollably engaged with the outer side of the flexible rail 9, and the driving wheel 307 is connected with a power input end 305 of the servo motor 304, and the driving wheel 307 is driven to roll along the inner side of the flexible rail 8 and drive the transmission wheel 308 to roll along the outer side of the flexible rail.
- (5) The demonstrator is respectively in communication with the welding robot and the control box 2, and controls a traveling path and an operation position of the welding robot, and adjusts oscillation and welding operations of the welding gun according to an instruction of the control box 2.
- (6) The remote control terminal is in communication with the control box, so as to remotely monitor and configure the welding parameter generated or acquired by the control box, and in communication with a data acquisition device of the welding robot, so as to remotely monitor the welding parameter during a welding process.
- (7) The welding power supply is used for supplying power and comprise an inverter arc welding rectifier, which is more efficient, stable and energy-saving than normal thyristor arc welding rectifier.

Embodiment 2

A robotic welding method employing a flexible guide rail is performed according to the welding device of Embodiment 1, and comprises the following steps,
- step 1, fixing the welding gun clamping device of the removable welding robot to the supporting structure, and then assembling the supporting structure and the rail trolley together;
- step 2, connecting the welding robot to the demonstrator, connecting the demonstrator to the control box, connecting the control box, wire feed mechanism, and welding robot to a welding power source, and connecting the welding wire of the wire feed mechanism to the welding gun of the welding robot, such that all components can be operated normally;
- step 3, fixing the flexible rail to a side surface of the welding member through the magnetic adhesion device, fixing the magnetic adhesion device onto a side face of the welding member through an adjusting knob to make an extension direction of the flexible rail matched with a shape of the welding component;
- step 4, mounting the rail trolley onto the flexible rail to cause the welding robot to slide normally on the flexible rail, fixing the welding gun to the welding gun clamping device, and adjusting the welding gun to reach a welding angle;

step 5, accessing corresponding bevel form and welding position in the control box according to actual bevel shape of the welding component, and choosing one of the robot operation modes including automatic operation mode, semi-automatic operation mode, or manual operation mode, before detecting the bevel, adjusting flow of the shielding gas, an extension length of the welding wire and an angle of the welding gun;

step 6, performing a corresponding operation according to different modes for detecting the bevel, starting to detect the bevel shape, pressing a start button on the demonstrator to start sensing and detect a bevel angle, a plate thickness of the welding component, a root gap, a plate thickness difference and a welding length, and after completing sensing, moving the welding gun to a welding start point to prepare for welding;

step 7, after completing the sensing, according to bevel detection data, displaying the welding parameters generated automatically by the demonstrator in the control box, monitoring the welding parameter by a remote control terminal, and setting the welding parameters, when needed, by the control box itself or the remote control terminal, and performing the welding during the whole welding process according to a layer pass and welding parameters set by the control box;

step 8, remotely monitoring and adjusting the welding parameters during the welding process, through data connection between a data collector of the welding robot and a remote computer;

step 9, after completing the welding, exiting a program, disassembling the flexible rail and the welding robot and discontent the welding power and the control box, welding robot, and the wire feed mechanism to complete the welding of the welding components.

In addition to the above examples, the present invention also includes other examples, and all technical solutions formed by equivalent transformations or equivalent substitutions should fall within the scope of the claims of the present invention.

What is claimed is:

1. A robotic welding device employing a flexible guide rail, comprising:
   a control box configured to pre-store various welding processes and to generate a welding parameter according to an actual welding position and welding groove shape;
   a wire feed mechanism configured to feed welding wire to a welding gun;
   a flexible guide rail, attached to a welding component, wherein the flexible guide rail is provided with a plurality of magnetic adhesion devices, and the plurality of magnetic adhesion devices are located on an identical side of the flexible guide rail, and wherein any one of the magnetic adhesion devices comprises a connecting plate and an upper magnetic adhesion block and lower magnetic adhesion block and the connecting plate is fixed on the flexible guide rail through an outer side of the flexible guide rail, and the connecting plate is provided with the upper magnetic adhesion block and the lower magnetic adhesion block on an inner side of the flexible guide rail, and wherein the flexible guide rail is attached to a welding member through the upper magnetic adhesion block and the lower magnetic adhesion block of each magnetic adhesion device, and wherein the upper magnetic adhesion block and the lower magnetic adhesion block are provided with a fixing knob;
   a welding robot, comprising:
      a robot body movably disposed on the flexible guide rail and movable along the flexible guide rail; and
      a welding gun disposed on the robot body and controlled by the robot body to weld the welding component;
   a teaching apparatus, in communication with the welding robot and the control box, and configured to control a traveling path and an operation position of the welding robot, and to adjust oscillation and welding operations of the welding gun according to an instruction of the control box;
   a remote control terminal, in communication with the control box, so as to remotely monitor and configure the welding parameter generated or acquired by the control box, and in communication with a data acquisition device of the welding robot, so as to remotely monitor and configure the welding parameter during a welding process; and
   a welding power supply, for supplying power.

2. The robotic welding device according to claim 1, wherein the wire feed mechanism is provided with a gas cylinder that provides shielding gas for the welding wire.

3. The robotic welding device according to claim 1, wherein the wire feed mechanism comprises a wire feed frame provided with a welding wire wheel, a wire tightening device, and an adjustment knob.

4. The robotic welding device according to claim 1, wherein the welding robot comprises a supporting structure, a welding gun clamping device, and a rail trolley, and
   the supporting structure is operable to move the welding gun laterally and vertically through the welding gun clamping device, and
   the supporting structure is movable on the flexible rail through the track trolley.

5. The robotic welding device according to claim 4, wherein the welding gun clamping device comprises a lateral adjustment structure and a vertical adjustment structure, and a swing device arranged on the vertical adjustment structure; and
   the vertical adjustment structure is arranged at an output end of the lateral adjustment structure, and the welding gun is arranged on the swing device, so as to realize a horizontal movement, vertical movement and angle adjustment of the welding gun.

6. The robotic welding device according to claim 4, wherein the rail trolley comprises a trolley body and a supporting structure is supported on the trolley body;
   the trolley body is provided with a driving wheel and a transmission wheel, and the transmission wheel is arranged on the trolley body through a roller connecting rod, and the driving wheel and the transmission wheel are respectively arranged on an inner side and outer side of the flexible rail, and
   the driving wheel is rollably engaged with the inner side of the flexible rail, the transmission wheel is rollably engaged with the outer side of the flexible rail, and the driving wheel is driven to roll along the inner side of the flexible rail and drive the transmission wheel to roll along the outer side of the flexible rail.

7. A welding method using a robotic welding device comprising:
   a control box configured to pre-store various welding processes and to generate a welding parameter according to actual welding position and welding groove shape;

a wire feed mechanism configured to feed welding wire to a welding gun;

a flexible guide rail, attached to a welding component, wherein the flexible guide rail is provided with a plurality of magnetic adhesion devices, and the plurality of magnetic adhesion devices are located on an identical side of the flexible guide rail, and wherein any one of the magnetic adhesion devices comprises a connecting plate and an upper magnetic adhesion block and lower magnetic adhesion block and the connecting plate is fixed on the flexible guide rail through an outer side of the flexible guide rail, and the connecting plate is provided with the upper magnetic adhesion block and the lower magnetic adhesion block on an inner side of the flexible guide rail, and wherein the flexible guide rail is attached to a welding member through the upper magnetic adhesion block and the lower magnetic adhesion block of each magnetic adhesion device, and wherein the upper magnetic adhesion block and the lower magnetic adhesion block are provided with a fixing knob:

a welding robot, comprising:
  a robot body movably disposed on the flexible guide rail and movable along the flexible guide rail; and
  a welding gun disposed on the robot body and controlled by the robot body to weld the welding component;

a teaching apparatus, respectively in communication with the welding robot and the control box, and configured to control a traveling path and an operation position of the welding robot, and to adjust oscillation and welding operations of the welding gun according to an instruction of the control box;

a remote control terminal, in communication with the control box, so as to remotely monitor and configure the welding parameter generated or acquired by the control box, and in communication with a data acquisition device of the welding robot, so as to remotely monitor and configure the welding parameter during a welding process; and a welding power supply, for supplying power, the method comprising:
  fixing a welding gun clamping device of the welding robot to a supporting structure, and then assembling the supporting structure and a rail trolley together;
  connecting the welding robot to the teaching device, connecting the teaching device to the control box, connecting the control box, wire feed mechanism, and welding robot to the welding power source, and connecting the welding wire of the wire feed mechanism to the welding gun of the welding robot, such that all can be operated normally;

fixing the flexible guide rail to a side surface of the welding member through the any one of the magnetic adhesion devices, fixing the any one of the magnetic adhesion devices onto a side face of the welding member through an adjusting knob to make an extension direction of the flexible guide rail matched with a shape of the welding component;

mounting the rail trolley onto the flexible guide rail to cause the welding robot to slide normally on the flexible guide rail, fixing the welding gun to the welding gun clamping device, and adjusting the welding gun to reach a welding angle;

accessing a corresponding welding groove shape and welding position in the control box according to an actual welding groove shape of the welding component, before detecting the welding groove shape, adjusting flow of a shielding gas, an extension length of the welding wire and an angle of the welding gun;

starting to detect the welding groove shape, pressing a start button on the teaching device to start sensing and detect a welding groove angle, a plate thickness of the welding component, a root gap, a plate thickness difference and a welding length, and after completing sensing, moving the welding gun to a welding start point to prepare for welding;

after completing the sensing, according to a bevel detection data, displaying welding parameters generated automatically by the control box, monitoring the welding parameters by a remote control terminal, and setting the welding parameters, when needed, by the control box itself or the remote control terminal, and performing the welding during an entirety of the welding process according to a layer pass and the welding parameters set by the control box;

remotely monitoring and adjusting the welding parameters during the welding process, through data connection between a data collector of the welding robot and a remote computer; and after completing the welding, exiting a program, disassembling the flexible guide rail and the welding robot to complete welding.

\* \* \* \* \*